UNITED STATES PATENT OFFICE.

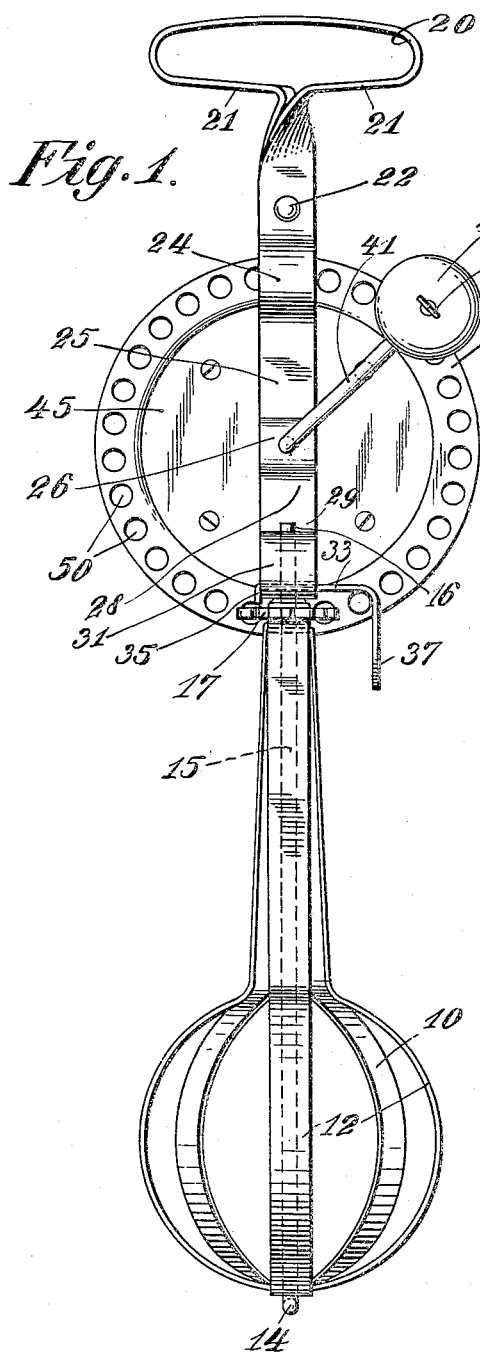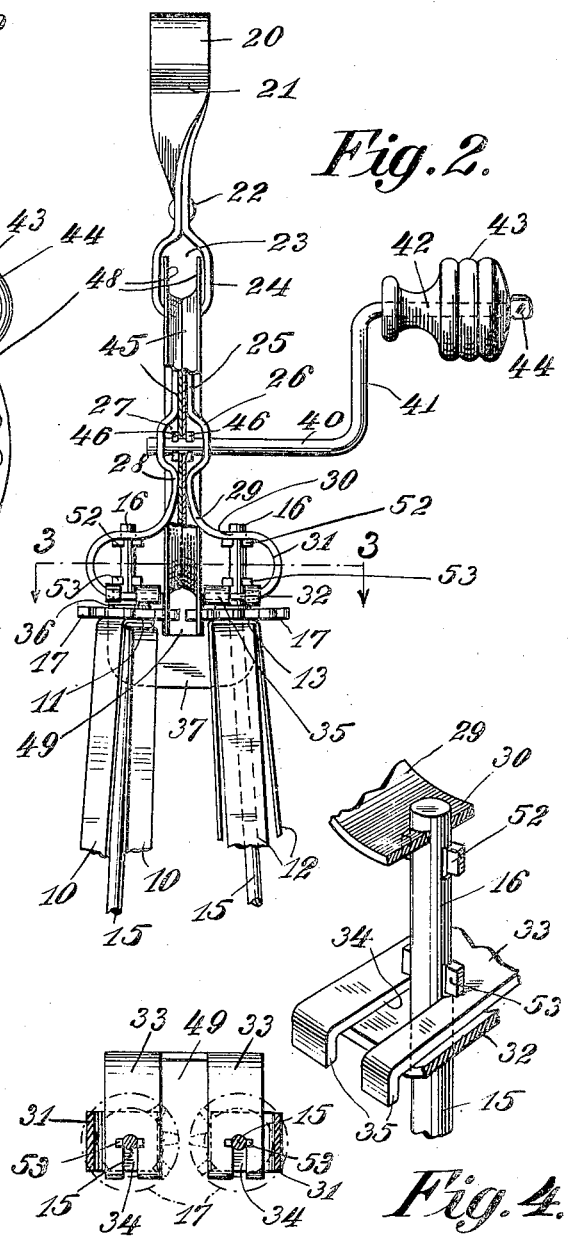

GEORGE E. ALEXANDER, OF NEW YORK, N. Y., ASSIGNOR TO MARGARET A. ALEXANDER, OF MILLERSTOWN, PENNSYLVANIA.

EGG-BEATER.

1,236,814.  Specification of Letters Patent.  Patented Aug. 14, 1917.

Application filed May 4, 1917. Serial No. 166,488.

*To all whom it may concern:*

Be it known that I, GEORGE E. ALEXANDER, a citizen of the United States, residing in New York, in the county of New York and State of New York, have invented certain new and useful Improvements in Egg-Beaters, of which the following is a specification.

This invention relates to improvements in beaters or mixers, and particularly to types adapted to be manually operated whereby one or more substances, contained within a bowl or like vessel, may be intimately commingled.

The principal object of the invention is to provide a beater comprised of few and simple parts and those parts made by simple stamping operations at a minimum of expense.

A further object is to provide a beater comprised exclusively of parts so designed and formed as to avoid the use of a multiplicity of screws, rivets or other securing means, and yet present a characteristically strong, durable and neat appearing implement.

A further object is to provide means by which the rotative parts are so engaged as to prevent wabbling, binding or unevenness of action, so that their proper operation may be effected with a minimum of uniform muscular effort.

These and other like objects are attained by the novel construction and combination of parts hereafter described and shown in the accompanying drawing, forming a material part of this disclosure, and in which:—

Figure 1 is a side elevational view of a beater made in accordance with the invention.

Fig. 2 is a partial front elevational view of the same.

Fig. 3 is a transverse sectional view taken on line 3—3 of Fig. 2, and

Fig. 4 is an enlarged perspective view indicating the type of holding means employed throughout wherever possible.

Like other beaters of a similar type, the beater blades are arranged in two oppositely disposed pairs 10 and 12, having lower arcuately curved operative ends, pivoted on the extending loop 14 of the guide rod 15, the same being bent so as to form a pair of substantially parallel elements 16, upon which the spur pinions 17 are journaled immediately above the inturned ends 11 and 13 of the beater arms 10 and 12, the pinions operating in the same plane.

An open loop handle 20 is formed at the center of a single strip of sheet metal, the ends curving downward and inwardly forming elements 21 substantially parallel with the upper element 20 between which the fingers are contained, the strip being given a twist or half-turn after which the two sides are brought intimately together and connected by the rivet 22, the sides being bent out below forming a space 23, the strip 24 then closed toward each other as at 25, and then outwardly as at 26, forming a second space 27, again in at 28 for a short distance, curving out at 29, into right angular projections 30 having reëntrant curves 31, ending in arms 32, parallel with the elements 30 through both of which extend the ends 16 of the guide rod.

A plate 33 is formed with an open slot 34, and downturned terminals 35, which pass over the elements 32, closely against their lateral edges, while upon the opposite side the plate 33 is bent downwardly at 36, joined by the integral connection 37 to a duplicate element upon the other side, thereby holding the rod ends 16 and pinions 17 at a rigid spaced distance one from the other.

Passing centrally through the space 27 and side elements 26 is a spindle 40, having an angular arm 41, terminating in an offset parallel element 42, upon which the knob 43 is rotatably mounted, the same being held in position thereon by upsetting the extreme end 44 as indicated.

A sectional wheel 45 is mounted upon the spindle 40 and is held rigidly thereto by lugs 46, pressed integrally from the spindle 40 upon opposite sides of the two plates constituting the wheel in such manner as to hold the same firmly in position and cause the wheel, as a whole, to rotate when the spindle 40 is actuated.

These two wheel sides rotate closely between the frame elements 25 and are curved arcuately outward along their periphery, forming a groove closely fitting within the space 23, the side walls 24 of which prevent any side movement.

The wheel is further guided by the slot 49, formed in the connecting element 37 of the plate 33 at the lower side, thereby compelling the wheel to rotate truly upon its axis.

Formed in the wheel rims 48 are a plurality of round openings 50, in which the teeth of the pinions 17 engage as the wheel is rotated, thus transmitting rotary motion to them, and through them to the beater blade in an obvious manner.

These pinions are held in axial alinement and properly spaced by reason of the rod ends 16, passing through openings appropriately formed in the elements 30 and 32 formed with the reëntrantly curved lower portion of the handle and which are held therein by upsetting or pressing lugs, respectively 52 and 53, directly from the rod material, thereby preventing longitudinal motion of the rods with respect to the loops, the center distance of the pinions being maintained by the slotted plates 23.

From the foregoing it will be evident that the handle or frame element is comprised of a single piece and that one rivet only is used, the remaining fastenings being formed by extruding the lugs from the metal parts direct; also that the two parts of the wheel, which are exactly duplicates, are held together by rivets pressed from one part into the other, and that the wheel is so held with respect to its bearings as to avoid any lateral movement whatever as it is caused to rotate.

It is also obvious that cast material of any kind is avoided, the parts being all comprised of roller stock, cut, formed and assembled by ordinary stamping processes, thus forming an article light in weight, durable in its nature, and easy to operate.

Having thus described my invention, what I claim as new, and desire to secure by Letters Patent, is:—

1. In a beater, the combination with two pairs of beater blades, a forked guide rod therefor, and a pair of spur pinions rigidly engaged with the upper end of said beater blades, said pinions being rotatable on the forks of said rods, of a combined frame having a reëntrantly turned looped base and a handle stamped from a single piece of sheet metal, lugs integrally formed from said guide rod rigidly engaged between the base elements of said frame, a wheel rotatable in said frame, means for rotating said wheel, and means formed with said frame preventing lateral motion of said wheel.

2. In a beater, the combination with oppositely disposed series of beater blades, said blades having angularly turned upper ends, a pair of spur pinions to which said upper ends are rigidly affixed, and a guide rod for said beater blades, said guide rod having a forked upper end upon which said pinions are rotatably mounted, of a combined frame and handle made from a single piece of sheet material, a base formed with said frame in which the forked ends of said rod are mounted, means for securing said rod ends rigidly therein, a spacing plate secured to said base whereby said pinions are maintained in proper relation, a spindle mounted at right angles in said frame, means for rotating said spindle, a sectional wheel mounted on said spindle between the sides of said frame, and means formed in the periphery of said wheel engageable with said pinions.

3. In a beater, the combination with a pair of spur pinions, beater blades rigidly engaged therewith upon one side and support rods upon which said pinions are rotatably engaged, of a unitary handle and frame having a base upon which said support rods are rigidly engaged, lugs integrally formed with said support rods rigidly engaged between the elements of said base, a rigid plate engaged in said base whereby said support rods are held in proper relation, a pinion driving wheel rotatably mounted in said frame, means for rotating said wheel, and means formed with said frame preventing the lateral motion thereof.

In testimony whereof I have signed my name to this specification.

GEORGE E. ALEXANDER.